United States Patent [19]

Uno

[11] Patent Number: 5,128,777
[45] Date of Patent: Jul. 7, 1992

[54] IMAGE READING APPARATUS
[75] Inventor: Teruhiko Uno, Tokyo, Japan
[73] Assignee: Kabushiki Kaisha Toshiba, Tokyo, Japan
[21] Appl. No.: 437,893
[22] Filed: Nov. 17, 1989
[30] Foreign Application Priority Data
  Nov. 18, 1988 [JP] Japan .................. 63-290150
[51] Int. Cl.⁵ .............................. H04N 1/40
[52] U.S. Cl. .................... 358/448; 358/453; 358/462
[58] Field of Search ............. 358/447, 448, 452, 453, 358/462, 464, 451, 467, 474, 486

[56] References Cited
U.S. PATENT DOCUMENTS

| | | | |
|---|---|---|---|
| 3,912,861 | 10/1975 | Vandling | 358/486 |
| 3,919,464 | 11/1975 | Kondoh | 358/476 |
| 4,290,084 | 9/1981 | Minshull et al. | 358/451 |
| 4,303,948 | 12/1981 | Arai et al. | 358/903 |
| 4,447,830 | 5/1984 | Stoffel | 358/462 |
| 4,614,977 | 9/1986 | Kawahara et al. | 358/451 |
| 4,656,524 | 4/1987 | Norris et al. | 358/76 |
| 4,862,283 | 8/1989 | Smith | 358/447 |

FOREIGN PATENT DOCUMENTS

| | | |
|---|---|---|
| 6173471 | 9/1984 | Japan . |
| 60-130262 | 7/1985 | Japan . |
| 2219647A | 5/1984 | United Kingdom . |

Primary Examiner—Jin F. Ng
Assistant Examiner—Jerome Grant, II
Attorney, Agent, or Firm—Finnegan, Henderson, Farabow, Garrett, and Dunner

[57] ABSTRACT

An image reading apparatus for reading image formed on a document. The apparatus includes a scanner for scanning the image and forming image data, a driver for driving the scanner, a data processor for processing the image data and outputting information generated from the image data, a memory storing the output information from the data processor and a controller for setting a large thinning rate to be used by the data processor at a rough reading operation.

2 Claims, 5 Drawing Sheets

IMAGE READING APPARATUS

FIELD OF THE INVENTION

The present invention relates generally to an image reading apparatus, and more particularly to an image reading apparatus that reads document images and provides data to other systems.

BACKGROUND OF THE INVENTION

A typical image reading apparatus has a structure as shown in FIG. 1. In FIG. 1, the image reading apparatus has a body 11 and a cover 13. The body 11 houses many elements, including optical members, mechanical elements and electrical circuits. The cover 13 covers a document exposure base 12 (see FIG. 2) on the body 13. The document exposure base 12 is made of a light translucent material, e.g., glass. A document containing an image to be read is held between the document exposure base 12 and the cover 13. The body 11 is further provided with a control panel 14 on the front of the body 11 so that the control panel 14 is exposed.

The image reading apparatus has a scanner 15. The scanner 15 is provided below the document exposure base 12, as shown in FIG. 2. The scanner 15 moves along the document exposure base 12 and optically scans an image on a document D which is held between the document exposure base 12 and the cover 13. The scanner 15 has a light source 16, a focus lens 17, a photoelectric transducer 18 and a carriage 19. The light source 16 illuminates the ducument D. The focus lens 17 optically picks up the document images and focuses the images on the photoelectric transducer 18. The photoelectric transducer 18 generates electrical outputs in response to the document images.

The photoelectric transducer 18 has a photo detector, for instance, a CCD (Charge Coupled Device) line sensor for reading the document images in a line along the CCD line sensor. The CCD line sensor of the photoelectric transducer 18 has a resolution of, for instance, 16 lines/mm for its longitudinal direction, or the direction perpendicular to the scanning direction of the scanner 15.

The scanner 15 is driven by a scanner driving mechanism, as shown in FIG. 3. The scanner driving mechanism has a guide rail 21, a guide rod 22, a timing belt 25 and a pulse motor 26. The guide rail 21, the guide rod 22 and the timing belt 25 are disposed along the scanning direction. The carriage 19 is provided with a roller 20 at one end. The roller 20 has been designed to travel on the guide rail 21. Further, at another end of the carriage 19, the guide rod 22 passes through the carriage 19. Thus, the carriage 19 is movable along the guide rail 21 and the guide rod 22.

The carriage 19 is fixed to the timing belt 25. The timing belt 25 is suspended between two pulleys 23 and 24. One of the pulleys 23 and 24, e.g., the pulley 24, is coupled to the pulse motor 26. Thus, the scanner 15 is driven in the scanning direction by the pulse motor 26.

Generally, such an image reading apparatus, as described above, is provided with a read region designator which designates a region of document images to be read. The read region designator consists of an electrical circuit (not shown). When reading a specified region of the document image, coordinate dimensions of the specified region are determined by manual operation of a keyboard of any equipment coupled to the scanner 15. Therefore, it takes much time to designate a specified region to be read. Further, if many regions of the document are to be read, the designating process becomes very complicated.

Another method has been used in the past for designating an image reading region. According to the method, all images on a document are first read and displayed on a display screen of a device, such as an image processor. A specified region of the image to be read is then designated by using a pointing device, e.g., a mouse.

However, this type of image reading apparatus has a considerably high resolution, for instance, 4 lines/mm, 8 lines/mm or 16 lines/mm. If, for instance, the entire document image in an A3 size is read in three colors of R, G and B, 256 gradations and a resolution of 16 lines/mm, the conventional image reading apparatus needs an image memory with a large volume, i.e., more than 95 M bytes (mega bytes). Further, the conventional image reading apparatus described above is slow in designating regions of document images to be read.

SUMMARY OF THE INVENTION

It is, therefore, an object of the present invention to provide an image reading apparatus which is able to solve the above-described problems.

Another object of the present invention is to provide an image reading apparatus which is capable of reading and processing entire document images at high speed using a relatively small capacity memory.

In order to solve the problem, the image reading apparatus involved in the present invention includes a scanner for scanning the image and forming image data, a driver for driving the scanner, a data processor for processing the image data and outputting information generated from the image data, a memory storing the output information from the data processor and a controller for setting a large thinning rate to be used by the data processor at a rough reading operation.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 5A and 5B and 6 are a flow-chart and an explanatory view both showing the operation of the apparatus of FIG. 4.

DESCRIPTION OF THE PREFERRED EMBODIMENTS

Figure 5A:
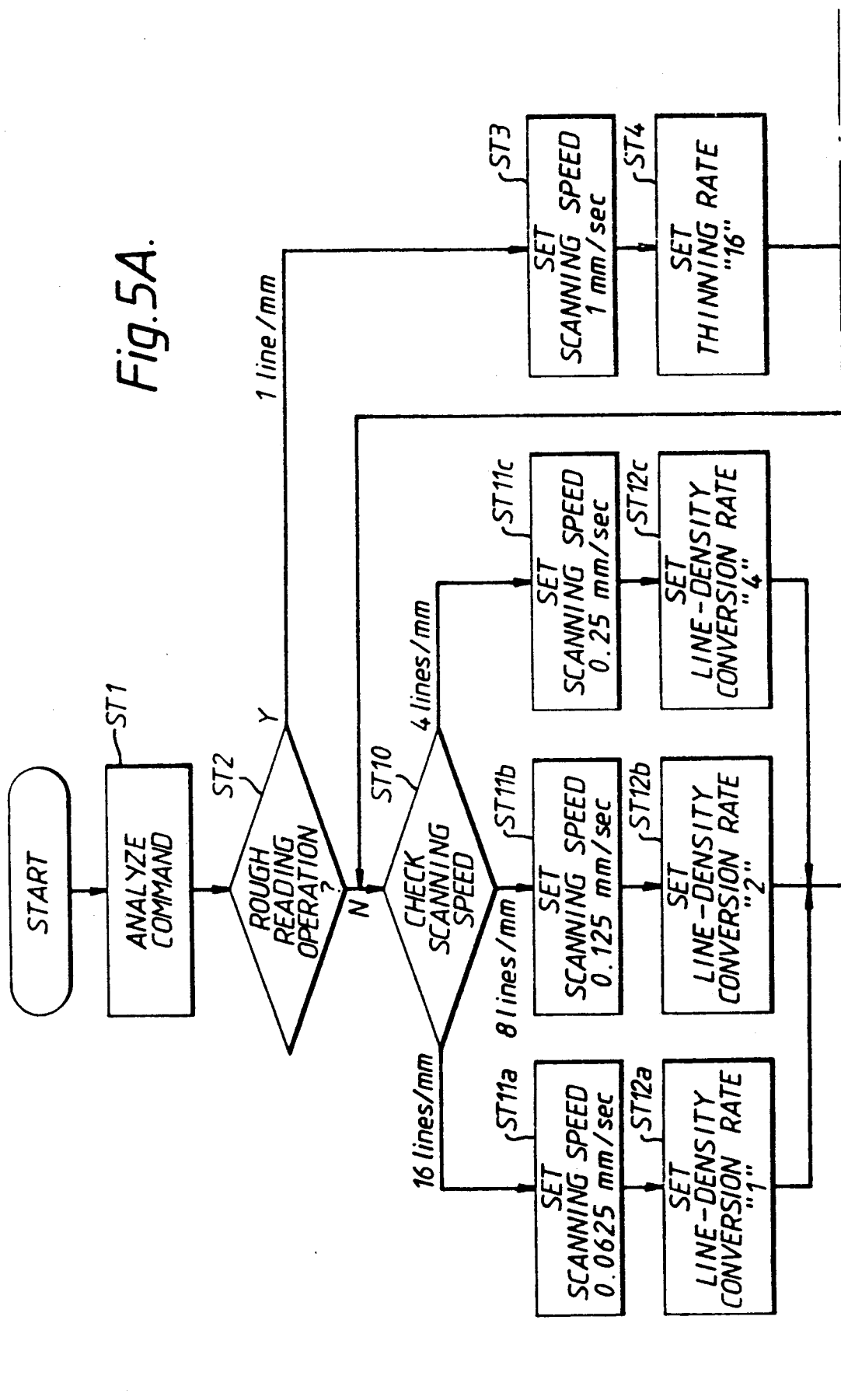
Figure 4:
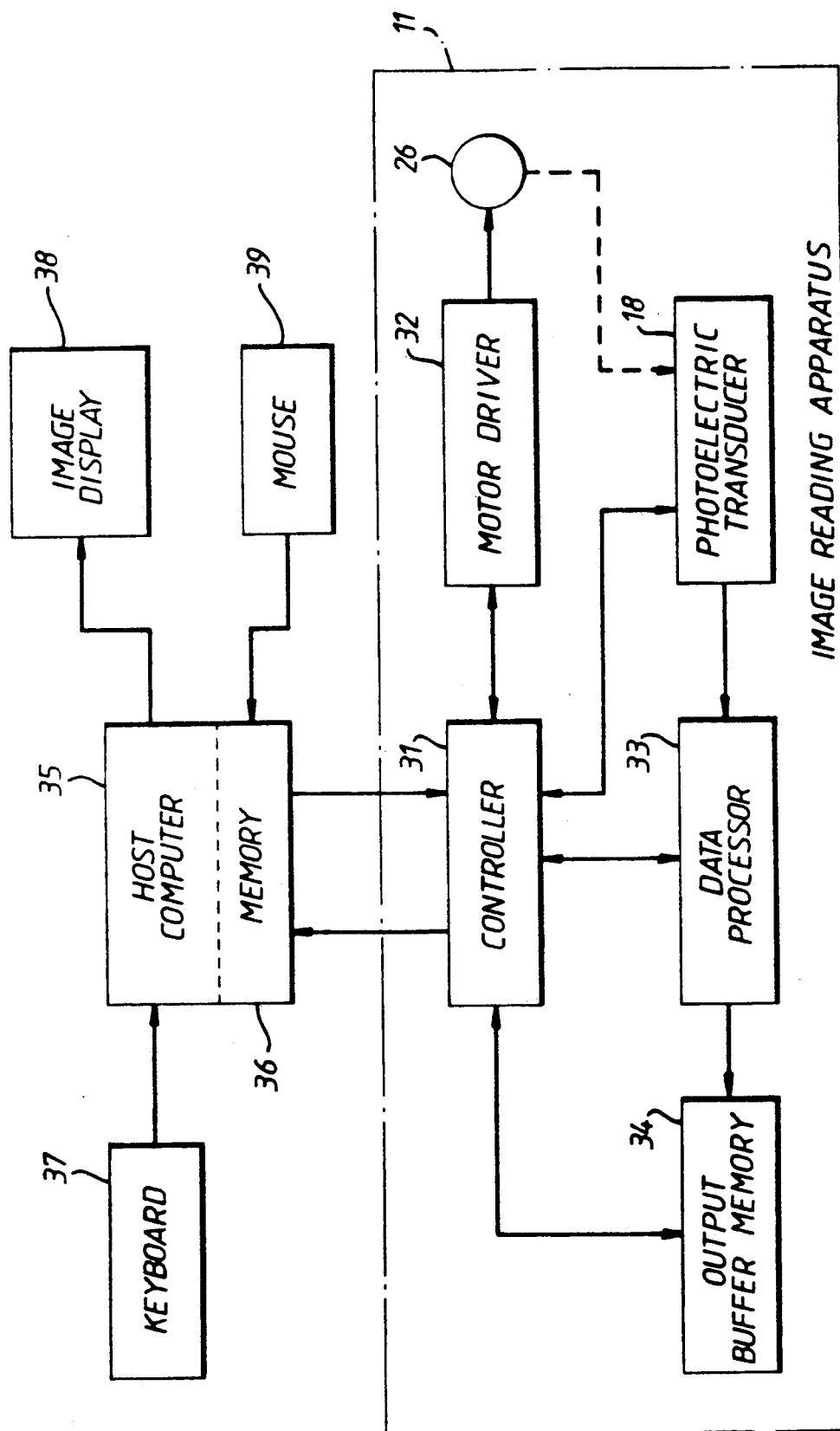
Figure 6:
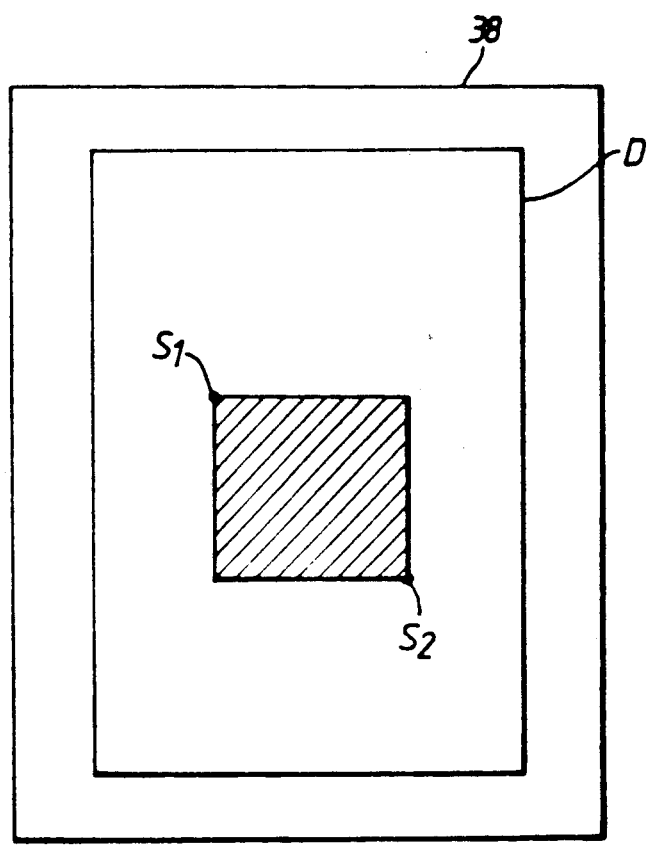

Embodiments of the present invention will be described in detail with reference to the attached drawings, i.e., FIGS. 4, 5 and 6. Throughout the drawings, like or equivalent reference numerals or letters will be used to designate like or equivalent elements for simplicity of explanation.

Figure 1:
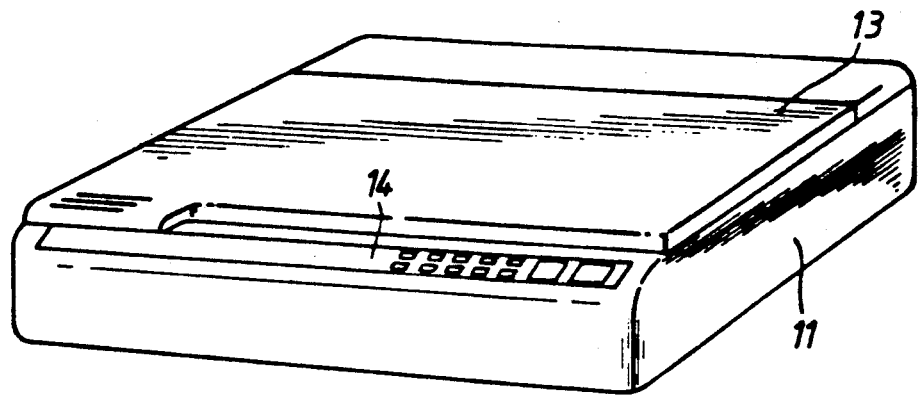
FIG. 1 is a perspective view of a typical image reading apparatus.
Figure 2:
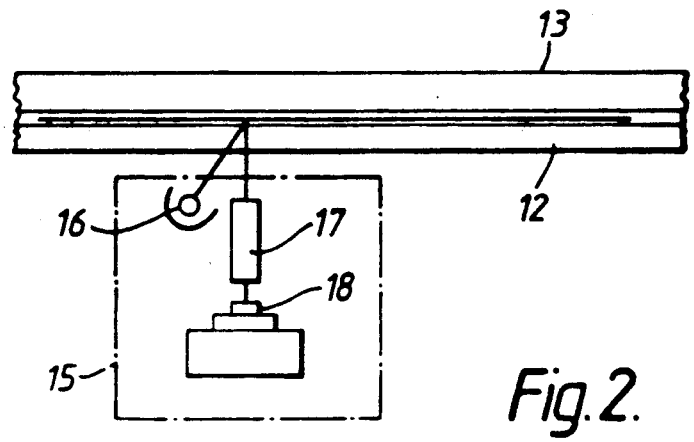
FIG. 2 illustrates the image reading portion of the apparatus of FIG. 1.
Figure 3:
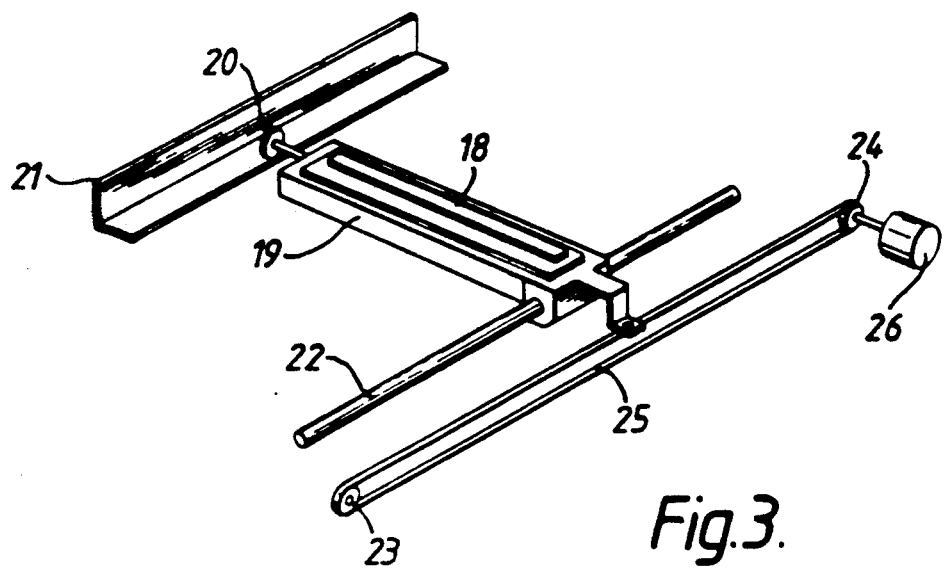
FIG. 3 is another illustration of the image reading portion of the apparatus of FIG. 1.
Figure 4:
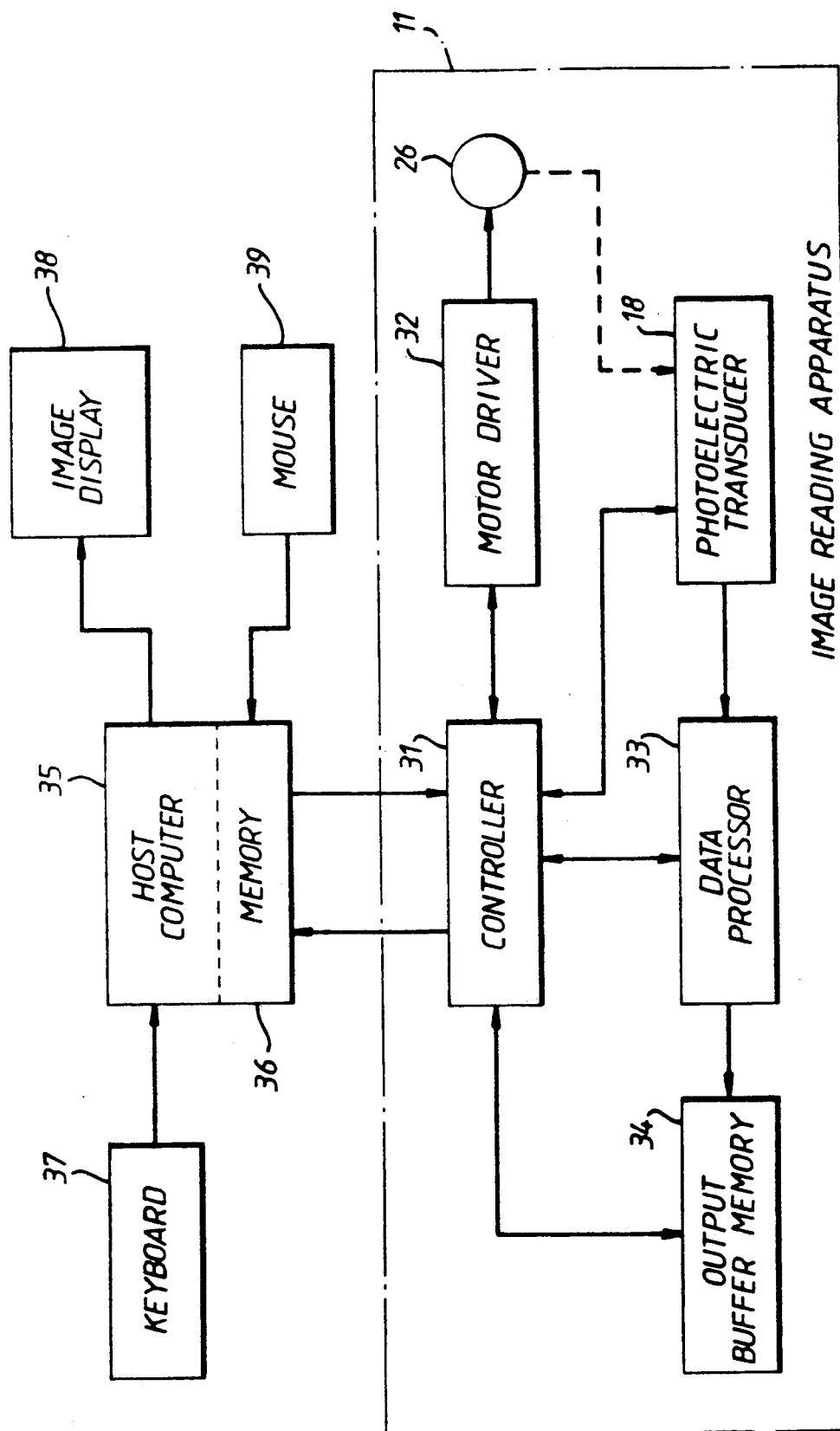
FIG. 4 is a block diagram showing an embodiment of the image reading apparatus according to the present invention.

In FIG. 4, the embodiment of the image reading apparatus 11 has a controller 31, a motor driver 32, a photoelectric transducer 18, a data processor 33, an output buffer memory 34 and a motor 26. The controller 31 controls the entire image reading apparatus. The controller 31 is coupled to the motor driver 32, the photoelectric transducer 18, the data processor 33 and the output buffer memory 34. The motor driver 32 controls the motor 26 which drives a scanner 15 (see FIGS. 2 and 3), which is provided with the photoelectric transducer 18.

The data processor 33 processes an output signal from the photoelectric transducer 18 so that the line density of the output signal is converted to another line density, for instance, 4 lines/mm, 8 lines/mm, 16 lines/mm, or even 1 line/mm for rough image reading, can be set. A line-density conversion signal output from the data processor 33 is temporarily stored in the output buffer memory 34, which has a storage capacity of, for instance, approximately 400 k bytes.

In addition, the controller 31 is connected to a host computer 35 of an apparatus such as a personal computer or a work station. Such apparatus is provided with a memory 36. Further, the host computer 35 may be provided with a keyboard 37, an image display 38 and a mouse 39. The keyboard 37 is used for inputting various information. The image display 38 displays various information. The mouse 39 is used as a pointing device which indicates the information displayed on the image display 38. A command for directing a rough image reading operation, a reading at an ordinary density of 8 lines/mm or 16 lines/mm, etc., may be output from the host computer 35 according to the operation of the keyboard 37.

The operation of the image reading apparatus 11 in the invention as described above will be described in detail below in reference to FIGS. 5A and 5B.

When operating the image reading apparatus 11, a command is output from the host computer 35. This command is analyzed by the controller 31 in the image reading apparatus 11 (steps ST1 and ST2). As a result of the analysis, if it is judged that a rough image reading operation is directed, a rough scanning speed, e.g., 1 mm per main scan time, which is the most highest speed among the scanning speeds of the scanner 15, is set for the motor driver 32 (step ST3). Also, a rough thinning rate, e.g., "16" data per 16 data), which is the most highest thinning rate among the thinning rates of the data processor 33, is set into the data processor 33 (step ST4).

Therefore, the motor 26 is driven by the motor driver 32 at the speed set as described above, the scanner 15 moves at the first scanning speed 1 mm per main scan time, and images on the document D placed on the document exposure base 12 (see FIG. 2) are read through the photoelectric transducer 18 (step ST5). The output of the photoelectric transducer 18 is supplied to the data processor 33, where input data are thinned out at the first thinning rate "16". As a result, when entire document images of the A3 size are read in three colors of R, G and B and in 256 gradations in the rough reading mode, the volume of data is about 374 k bytes. Output data from the data processor 33 are stored in the output buffer memory 34 (step ST6). When all data of the document images from the data processor 33 are stored in the output buffer memory 34, these data are transferred to the memory 36 of the host computer 35 (step ST7). Thus, the image data stored in the memory 36 are displayed on the image display 38. Therefore, a rough image of the entire region of the document D is displayed on the image display 38, as shown in FIG. 6. The rough image is then used for a distinct image reading of a limited region of the document D.

On the display 38, two diagonal points S1 and S2 of a desired limited region image S1-S2 of the document D, which is to be transferred to other apparatus, is designated by using the mouse 39 (step ST8). At the time, a desired scanning speed for the distinct image reading is designated through the keyboard 37. The host computer 35 sets the region data corresponding to the diagonal points S1 and S2 and the designated scanning speed to the controller 31 of the image reading apparatus 11 in the controller 31 (step ST9). The controller 31 judges the designated scanning speed (step ST10). Here, if it is judged that the distinct image reading for the entire region of the document D in the step ST2, the process directly goes to the step ST10.

When a first distinct scanning speed has been set, the process goes to a step ST11a. When a second distinct scanning speed has been set, the process goes to a step ST11b. When a third distinct scanning speed has been set, the process goes to a step ST11c. In the step ST11a, a low scanning speed, e.g., 0.0625 mm per main scan time is set in the motor driver 32. Also, a high line-density conversion rate, e.g., "1" (1 to 1 data) is set into the data processor 33 (step ST12a). In the step ST11b, an intermediate scanning speed, e.g., 0.125 mm per main scan time is set in the motor driver 32. Also, an intermediate line-density conversion rate, e.g., "2" (1 per 2 data) is set into the data processor 33 (step ST12b). In the step ST11c, a high scanning speed, e.g., 0.25 mm per main scan time is set in the motor driver 32. Also, a low line-density conversion rate, e.g., "4" (1 per 4 data) is set into the data processor 33 (step ST12c).

Then the limited region of the document image is read at the set scanning speed and the line-density conversion rate corresponding to the set scanning speed (step ST13). Thereafter, the data processor 33 supplies distinct image data read by the photoelectric transducer 18 to the output buffer memory 34 (step ST14). Thus the buffer memory 34 successively stores the distinct image data. If the output buffer memory 34 becomes full or the distinct image reading of the limited region has been completed, the scanning operation of the scanner 15 is interrupted and the data stored in the output buffer memory 34 are transferred to the memory 36 of the host computer 35 (step ST15). Following the step ST15, it is checked whether the the distinct image reading of the limited region has been completed or not (step ST16). If the distinct image reading of the limited region has not been completed, the steps ST13 to ST16 are repeated until the distinct image reading of the limited region completes. If the distinct image reading of the limited region has been completed, the process goes to END.

According to this embodiment, a command for rough reading is first set so that the entire region of the document images is read at a high speed and signal processing is carried out at a larger thinning rate than ordinary. Thus, not only can the document images can be read at a high speed, but also the volume of image data can be reduced and it becomes possible to reduce the time needed for signal processing.

Further, the document scanning speed and the thinning rate for the data processor 33 are set in the image reading apparatus 11 itself. This reduces the load on the host computer 35 in that the host computer 35 needs only to supply the required command. Therefore, they do not affect the construction of the host computer 35.

The output buffer memory 34 is used for rough reading as well as ordinary reading in this embodiment, but the invention is not limited to this, the output buffer memory 34 may be used only for rough reading and the memory of the host computer 35 may be used for normal reading.

As described above, according to the present invention, it is possible to provide an image reading apparatus which is capable of storing entire document images in a storage means of small capacity and shorten data processing time by operating the driving means at high speed, scanning and reading the entire document images by the scanning means at the high speed, processing the document images which are read by the scanning means through the signal processing means with a large thinning rate set, and storing the selected data in the storage means.

The preferred embodiment of the present invention operates the driving means at high speed, scans and reads the entire document images at high speed, processes the document images thus read by the scanning means through the signal processing means for which a large thinning rate has been established, and stores them in the storage means, and is thus capable of storing the entire document images in a storage means of small capacity and, at the same time, makes it possible to reduce the data processing time.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A method for reading images formed on a document, comprising the steps of:
   performing a rough reading operation that tends to suppress details by scanning the images at a relatively high speed with an image scanning means;
   generating image data from the image scanning means;
   thinning the image data at a relatively high thinning rate to produce thinned image data;
   using the thinned image data to designate a portion of the image to be read in a normal reading operation;
   performing a normal reading operation on the designated portion of the image by scanning the selected portion at a relatively low speed with the image scanning means;
   generating designated image data from the image scanning means; and
   thinning the designated image data at a low thinning rate.

2. A method of reading an image on a document comprising the steps of:
   pre-scanning the image at a rough scanning speed for producing rough image data;
   storing the rough image data;
   displaying a rough image corresponding to the stored rough image data;
   designating a prescribed region on the rough image;
   setting a prescribed distinct scanning speed; and
   rescanning the image in the designated region at a prescribed distinct scanning speed lower than the rough scanning speed.

* * * * *